(12) United States Patent
Ward et al.

(10) Patent No.: US 12,173,828 B2
(45) Date of Patent: Dec. 24, 2024

(54) CONNECTOR FOR A SUBSEA DRILLING RISER

(71) Applicant: Aquaterra Energy Limited, Norwich (GB)

(72) Inventors: Martin Ward, Norwich (GB); Benjamin Cannell, Norwich (GB)

(73) Assignee: Aquaterra Energy Limited, Norwich (GB)

( * ) Notice: Subject to any disclaimer, the term of this patent is extended or adjusted under 35 U.S.C. 154(b) by 0 days.

(21) Appl. No.: 17/919,777

(22) PCT Filed: Apr. 20, 2021

(86) PCT No.: PCT/GB2021/050949
§ 371 (c)(1),
(2) Date: Oct. 19, 2022

(87) PCT Pub. No.: WO2021/214452
PCT Pub. Date: Oct. 28, 2021

(65) Prior Publication Data
US 2023/0175625 A1    Jun. 8, 2023

(30) Foreign Application Priority Data
Apr. 20, 2020 (GB) ...................... 2005679

(51) Int. Cl.
*F16L 41/00* (2006.01)
*F16L 1/26* (2006.01)
(Continued)

(52) U.S. Cl.
CPC .............. *F16L 41/008* (2013.01); *F16L 1/26* (2013.01); *F16L 25/065* (2013.01); *E21B 17/01* (2013.01); *F16L 2201/30* (2013.01)

(58) Field of Classification Search
CPC . F16L 1/26; F16L 25/06; F16L 25/065; F16L 25/08; F16L 41/008; F16L 17/08;
(Continued)

(56) References Cited

U.S. PATENT DOCUMENTS 3,141,685 A * 7/1964 Watts .................. F16L 17/08
277/625
3,155,401 A * 11/1964 Musolf ................. E21B 33/04
166/344

(Continued)

FOREIGN PATENT DOCUMENTS

| GB | 1282811 A | 7/1972 |
| GB | 2315530 A | 2/1998 |
| GB | 2493094 A | 1/2013 |

OTHER PUBLICATIONS

Patrascu, Bogdan; International Search Report; PCT/GB2021/050949; Dated Jun. 21, 2021; 3 pages.

*Primary Examiner* — Aaron M Dunwoody
(74) *Attorney, Agent, or Firm* — Bradley Arant Boult Cummings

(57) ABSTRACT

The invention concerns a pipe joint formed between a pin section (10) and a box section (20); the pin and box sections each having a tubular pipe section, engaging at respective first ends in end-to-end arrangement and having a seal element partially therebetween, the box section including a collar extending from the first end, the collar being generally cylindrical, axially aligned with the tubular box pipe section and having an inner diameter of the same size as the outer diameter of the pin section, enabling the collar to be placed about the pin section, the pin and the box sections being secured together by means of a plurality of securing means housed in the collar and actuable to exert radial pressure to urge the pin and box into sealing arrangement, the collar (22) of the box section (20) including a test port, comprising a (Continued)

housing atrium, defined by an atrium wall, housing a test plug (60); the housing atrium (61) and the seal element (53) being fluidly linked by a box conduit; the plug comprising a plug body and a plug seal housed between the plug body and the housing atrium wall to seal the housing atrium from atmosphere and having therethrough a plug conduit connectable at a first end to a pressure test apparatus and fluidly linkable at a second end to the box conduit; the plug being moveable between a first position forming a fluid link between the plug conduit and the box conduit, and a second position closing the fluid link.

11 Claims, 3 Drawing Sheets

(51) Int. Cl.
 *F16L 25/06* (2006.01)
 *E21B 17/01* (2006.01)
(58) Field of Classification Search
 CPC ... F16L 2201/30; G01L 19/00; G01L 19/0007
 See application file for complete search history.

(56) References Cited

U.S. PATENT DOCUMENTS

| | | | |
|---|---|---|---|
| 3,455,578 A | 7/1969 | Hanes | |
| 3,679,238 A * | 7/1972 | Putch | E21B 33/0422 |
| | | | 285/347 |
| 4,068,865 A | 1/1978 | Shanks, II | |
| 4,597,448 A * | 7/1986 | Baugh | E21B 33/043 |
| | | | 166/348 |
| 4,623,020 A * | 11/1986 | Nichols | E21B 33/047 |
| | | | 166/88.4 |
| 4,799,714 A | 1/1989 | Collet | |
| 4,889,184 A * | 12/1989 | Lugtmeier | E21B 34/02 |
| | | | 166/80.1 |
| 5,868,524 A * | 2/1999 | Martin | F16L 37/62 |
| | | | 285/97 |
| 6,267,414 B1 * | 7/2001 | Mosse | F16L 23/18 |
| | | | 285/24 |
| 7,004,470 B2 * | 2/2006 | Hystad | G01M 3/2853 |
| | | | 277/614 |
| 8,333,237 B2 * | 12/2012 | Duhn | E21B 33/04 |
| | | | 166/75.13 |
| 8,511,393 B2 * | 8/2013 | Nguyen | E21B 33/04 |
| | | | 166/382 |
| 8,936,075 B2 * | 1/2015 | Guidry | E21B 43/2607 |
| | | | 166/177.5 |
| 10,465,487 B2 * | 11/2019 | Robottom | E21B 43/101 |
| 10,787,876 B1 * | 9/2020 | Livingston | E21B 33/03 |
| 2005/0139360 A1 * | 6/2005 | Van Bilderbeek | E21B 33/0422 |
| | | | 166/208 |
| 2007/0107910 A1 * | 5/2007 | McGuire | E21B 33/03 |
| | | | 166/85.4 |
| 2008/0017386 A1 * | 1/2008 | Van Bilderbeek | E21B 33/03 |
| | | | 166/195 |
| 2008/0083539 A1 * | 4/2008 | Hickie | E21B 33/068 |
| | | | 166/88.1 |
| 2008/0277120 A1 * | 11/2008 | Hickie | E21B 43/26 |
| | | | 73/152.01 |
| 2010/0047023 A1 * | 2/2010 | Horne | F16L 1/26 |
| | | | 285/146.1 |
| 2010/0206545 A1 * | 8/2010 | Nguyen | E21B 33/03 |
| | | | 166/88.4 |
| 2014/0209292 A1 * | 7/2014 | Watson | F04D 13/10 |
| | | | 166/105 |
| 2015/0041151 A1 * | 2/2015 | Cocker, III | E21B 33/0415 |
| | | | 166/380 |
| 2015/0048611 A1 * | 2/2015 | Shanks, II | E21B 17/02 |
| | | | 285/18 |
| 2015/0315869 A1 * | 11/2015 | Landry | E21B 34/02 |
| | | | 166/97.1 |
| 2016/0376863 A1 * | 12/2016 | Older | E21B 33/038 |
| | | | 166/368 |
| 2017/0016294 A1 * | 1/2017 | Thornburrow | E21B 33/0415 |
| 2018/0148989 A1 * | 5/2018 | Ross | E21B 33/0407 |
| 2018/0163902 A1 * | 6/2018 | Manning | F16L 17/08 |
| 2020/0049267 A1 * | 2/2020 | Pionetti | F16L 57/02 |
| 2023/0151912 A1 * | 5/2023 | Ward | E21B 17/046 |
| | | | 285/320 |

* cited by examiner

CONNECTOR FOR A SUBSEA DRILLING RISER

FIELD OF THE INVENTION

The present invention relates to a subsea drilling riser. In particular, a riser including an improved means of testing the seal between the main pipe elements of the riser assembly is disclosed. Additionally, a riser having improved resistance to stress fatigue is disclosed.

BACKGROUND TO THE INVENTION

The present invention seeks to address the problem of testing a seal between pipes, primarily in the oil field industry, and particularly seals between a pin and a box section included as part of a subsea riser system.

Subsea riser systems which link below-seabed pipework with surface located vessels or installations increasingly use a non-threaded joint between a seabed linked pin section and a corresponding box section. In modern installations, a box section is lowered onto a pin section and these are then clamped together using one or more of a number of means known in the art.

Although visual means can be utilised to give an indication of the correct alignment of the pin and box sections and of the seal being formed, the first indicator to the operator that the seal is defective is often only following assembly of the full string when pressurisation occurs. Dismantling the string to carry out a repair is then expensive in time and materials.

A further difficulty with such assemblies is that the strain caused in the pin section can be very large in the region immediately adjacent the seal due to the weight of the string above the pin which the pin is bearing. Moreover, the use of conventional elevators to lift and manoeuvre pipe sections, particularly where a pin section is lifted on multiple occasions can cause metal fatigue in the pin section. The fatigue of the pin pipe wall can cause loss of integrity of the main body of the pin.

It is an object of the present invention to provide a seal-testing means which can be included to address the above problems.

It is a further object of the invention to provide a pin section having increased resistance to fatigue.

SUMMARY OF THE INVENTION

According to a first aspect of the invention there is provided a pipe joint formed between a pin section and a box section;
  the pin and box sections each having a tubular pipe section, engaging at respective first ends in end-to-end arrangement and having a seal element partially therebetween,
  the box section including a collar extending from the first end, the collar being generally cylindrical, axially aligned with the tubular box pipe section and having an inner diameter of the same size as the outer diameter of the pin section, enabling the collar to be placed about the pin section,
  the pin and the box sections being secured together by means of a plurality of securing means housed in the collar and actuable to exert radial pressure to urge the pin and box into sealing arrangement,
  the collar of the box section including a test port, comprising a housing atrium, defined by an atrium wall, housing a test plug;
  the housing atrium and the seal element being fluidly linked by a box conduit;
  the plug comprising a plug body and a plug seal housed between the plug body and the housing atrium wall to seal the housing atrium from atmosphere and having therethrough a plug conduit connectable at a first end to a pressure test apparatus and fluidly linkable at a second end to the box conduit;
  the plug being moveable between a first position forming a fluid link between the plug conduit and the box conduit, and a second position closing the fluid link.

The arrangement described above enables the seal between the pin and box sections to be tested in a non-destructive fashion to provide reasonable confidence to the operator that once the pipe string, of which the pin and box sections are a components, is brought to working pressure then the seal will be sufficient to retain the pressure.

The collar preferably includes a collar connection section connecting the collar to the box tubular section, the connection section having an outer surface which is at an oblique angle to the axes of the collar and the box tubular section. Further preferably the collar connection section is of frusto-conical shape.

The oblique angle of the collar connection section reduces the risk of build up of debris on the collar.

Preferably the test port is located in the collar connection section.

The test port is thus separated from the means of securing the box to the pin, which brings mechanical advantages to the strength of the collar.

Preferably, the joint includes a further seal, further preferably an elastomeric seal, between the first ends of the pin and box sections and radially outward from the seal element. The further seal provides a back-up seal in case of failure of the seal element and also enables testing of the seal to occur.

Preferably, the plug conduit has laterally deployed side arms connecting the plug conduit with the exterior of the plug. This enables the seal provided by the test plug to be tested once the test plug is moved to the second position.

Preferably the box conduit engages the seal element at a right angle.

Preferably, the box conduit includes a dog-leg.

Preferably an elastomeric seal is interposed between the end-face of the plug body and the atrium wall, said seal sealing the box conduit from the outside of the plug body when the plug body is in the second position. Further preferably, the elastomeric seal is housed on the atrium wall.

BRIEF DESCRIPTION OF THE DRAWINGS

The invention is now described with respect to the accompanying drawings which show by way of example only, one embodiment of an incorporated pressure-test system and an embodiment of a stress fatigue resistant riser pipe. In the drawings.

DETAILED DESCRIPTION OF THE INVENTION

The use of subsea riser systems is widespread in bringing gases and liquids to the sea surface where they are collected and/or conveyed to a collection and processing facility. Usually a well head and/or subsea tree assembly is located on the sea floor to which the riser is connected. A number of methods are known by which to attach two sections of a riser joint together.

The particular method to which the current joint relates is one formed by a process in which a box section is lowered onto the end of a pin section so that the end walls of the tubular sections of the pin and box section align forming a continuous conduit for the fluid. The pin section can itself be secured in position at its opposite end by a spider or slips arrangement on a rig floor to minimise the pin section's movement. Once the pin and box sections are in position, the sections are secured together in a sealing arrangement as described below. It is important to determine properly the effectiveness of the seal without disturbing the seal itself. The presently described invention addresses this problem.

In addition, the pin section of the riser assembly needs to support the mass of a proportion of the string linking the seabed with the surface facilities. In a further aspect of the invention, means are provided to distribute the forces within the pin section to minimise the risk of fatigue to the pin section.

Figure 1:
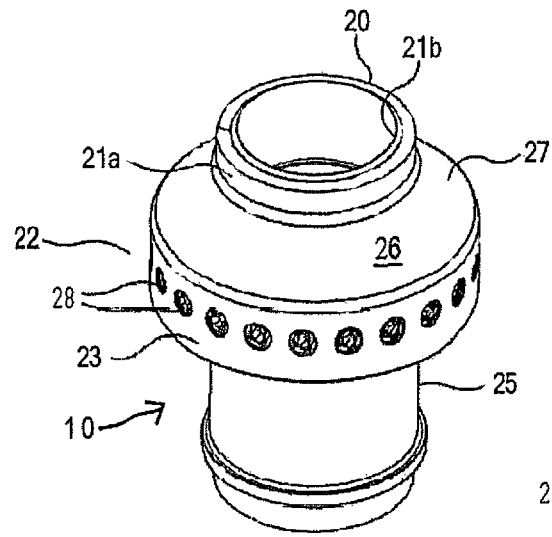
FIG. 1 is an isometric view of a pin and box assembly in accordance with the invention.
Figure 2:
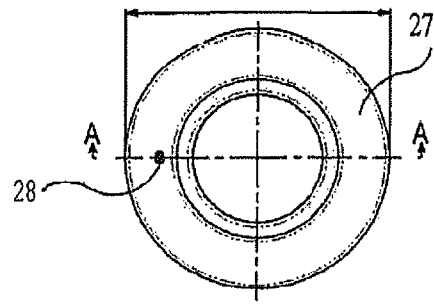
FIG. 2 is a plan view of the assembly of FIG. 1.

The general arrangement can be seen in FIG. 1 in which a seal between two sections—a pin section and a box section—is shown. The pin, generally referenced 10, is secured in position at its in use lower end to a rig floor. The box section 20 is lowered onto the free end of the pin 10, along with a metal to metal sealing gasket therebetween. Once the box 20 is in position, the two sections are sealed together to ensure they are fluid tight: typically to a pressure of around 17000 psi, but more generally to pressures of 3000 to 20000 psi. As a visual guide, a marking is provided on one or both of the pin 10 or the box 20 to enable correct alignment of the box 20 and the pin 10 relative to each other. As an example of a suitable marking, a coloured band can be applied to the outer surface of the pin 10, which enables both the axial position and also the mutual alignment of the pin's and the box's axes to be confirmed.

Generally, the box 20 has a tubular conduit 21 having an outer surface 21*a* and an inner surface 21*b*, in contact in use with the pressurised fluid. The inner diameter of the tubular conduit usually matches that of the inner surface 11*b* of the pin 10, at least in their in-use immediate vicinities, to provide smooth flow along the pipe string formed. Extending from the end of the box 20 is a collar 22 having an outer radial face 23 generally parallel to that of the tubular conduit 21. The diameter of the inner surface 24 of the collar 22 is such as to be contiguous on placement with the outer surface 25 of the pin 10, thus enabling a fluid tight seal to be easily made between these two surfaces 24, 25. The collar 22 is connected to the tubular conduit 21 of the box 20 by a connecting section 26. The connecting section 26 is generally frusto-conical. The outer face 27 of the connecting section 26 as shown is typically at an angle of around 45° with the tubular conduit 21, although the angle is chosen to suit the task for which the box is designed. In an alternative embodiment, not illustrated, the collar is joined directly to the tubular conduit 21, with no intermediate collar section.

Figure 3:
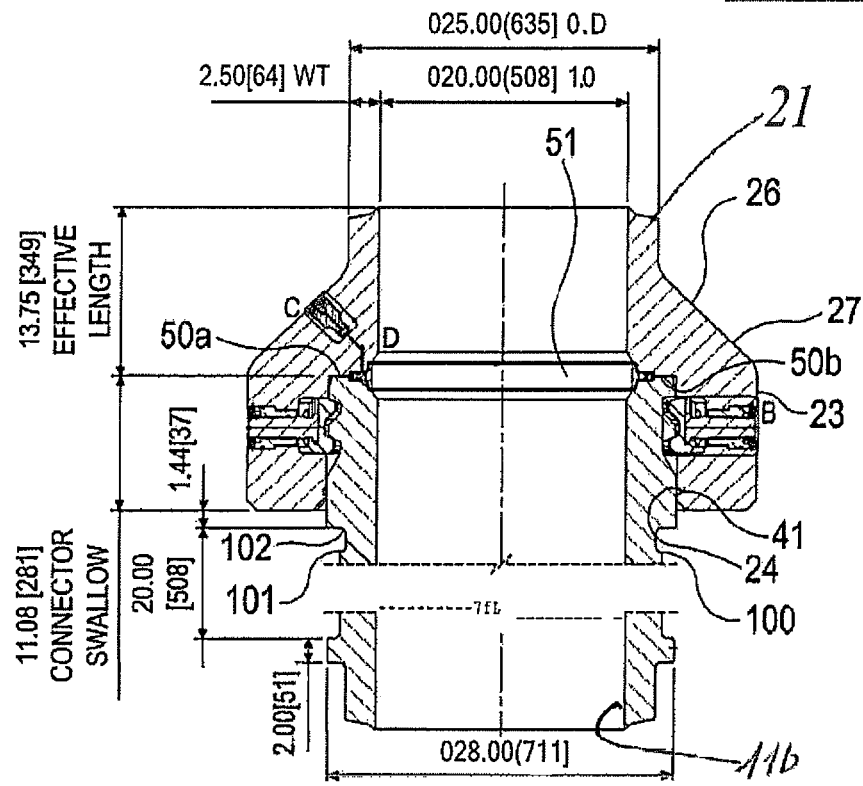
FIG. 3 is a sectional view through A-A of FIG. 2.
Figure 4:
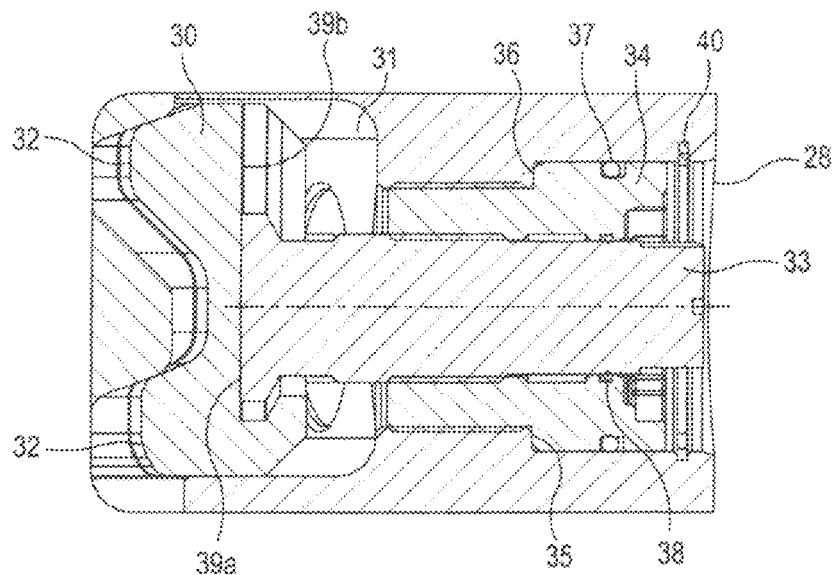
FIG. 4 is an enlarged view of the area shown as B in FIG. 3.

Referring now to FIGS. 3 and 4, these illustrate the means by which the pin 10 and box 20 sections are secured together in sealing arrangement. The radial face 23 of the box 20 includes a plurality of apertures 28. In each of these apertures is passed a securing system as shown in the sectional view of FIG. 3, and as in the enlarged view of FIG. 4.

The system comprises a dog 30 which is seated in an atrium 31 of the aperture 28. The dog 30 has an inward facing base 32 which is a complimentary profile to the outer face of the pin 10 against which it is seated.

Also located within the aperture 28 is an actuation screw 33, which is threadably housed within a screw bushing 34. A portion of the aperture 28 is so shaped to allow the screw bushing 34 to be threadably located in close seating arrangement with the wall of the aperture 28. The aperture 28 therefore includes a radial face 35 which engages a corresponding radial face 36 on the bushing 34 to prevent the bushing 34 from being located too far within the aperture 28.

In order to provide additional sealing to prevent fluid passage along the aperture 28, a Parker O-ring 37 is located about the bushing 34 with a further Parker O-ring 38 located between the screw 33 and the bushing 34.

In order to secure the box 20 to the pin 10 a torque is applied to the actuation screw 33, forcing the face 39*a* of the actuation screw 33 against the outer radial face 39*b* of the dog 30 such that the dog 30 is forced into engagement with the pin 10 through application of the radial force thus provided by the actuation screw 33. The size of the torque applied can be used to gauge when the box 20 is properly secured against the pin 10. An internal retaining ring 40 holds the bushing 34 in place.

To provide a further seal against fluid egress, an O-ring 41 is located in an annular groove in the box 20 to seal against the pin 10.

Once all of the actuation screws 33 around the circumference of the box 20 have been tightened to the correct torque values therefore, the pin 10 and the box 20 are effectively sealed together.

The primary route for exit of fluid, once the pressurised fluid is within the pipe string, is along the gap between the contiguously deployed axially facing circumferential surfaces 50*a*, 50*b* of the pin 10 and the box 20 respectively. The problems associated with this gap are often addressed by including a seal which extends into the gap. A typical seal used in this type of situation is that provided by a Grayloc® seal, but other types known in the art can be used. This is illustrated in FIG. 3 as 51 and in more detail in FIG. 7. The seal 51 is a metal-metal seal and its mode of action is primarily as a unidirectional seal, such that increased pressure within the pipe string acts to increase the strength of the seal as the seal material is pushed into the groove 52 in which the seal 51 is seated. However, where the outside pressure is large, the seal 51 is sufficiently strong to withstand several thousand psi pressure in that direction. An additional, O-ring type seal 53 is, as exemplified a Trelleborg AS seal H9T80, although other seals such as a Parker or a Walker seal can also be used. The additional seal 53 can function as a back-up seal if the seal 51 fails, but also enables the test port to function as described below.

The difficulty faced by an operator is that having installed the box 20 onto the pin 10, that of determining the integrity of the seal formed therebetween. As indicated, two visual means are provided which can be taken as indicia of the integrity: namely a marking, such as a coloured band and measuring the torque value applied to the actuation screw 33 to secure it in position. However, were the pipe string to be made up on the basis of these being positive, and it only then be found that the seal is defective, then the financial costs of replacement of the seal would be high.

The current invention therefore contemplates a test seal, incorporated into the box 20, and which applies a non-disruptive test to the Grayloc® seal. Further, once the main seal has been tested, the test seal can be plugged to prevent pressure loss through the test seal and also providing a visual indicator to the operator that testing has been carried out.

To test the seal by means of pressure applied to the interior of the pin and box assembly, before the complete string is made up, would be impractical. The present invention contemplates testing the seal against its ability to withstand an external pressure. It is acknowledged that the seal, and in particular a Grayloc® seal is weaker in this direction to applied pressure. Nevertheless, the ability of the seal to hold pressure, albeit a lower one than in use, can be taken as a reliable guide to the seal's capacity to hold the higher internal working pressure.

To this end, the present invention contemplates a test port into whose interior a test plug is inserted. The test port is connected by means of a conduit to the exterior of the Grayloc® seal. The conduit exits onto the seal 51 at a location radially interior from the seal 53, which seal 53 prevents pressure from being released radially along the gap between the pin 10 and the box 20. Pressure is prevented from exiting via the test plug (see below) by means of a further seal 64. If the pressure applied via the test plug holds therefore, a strong indication is provided at the Grayloc® seal 51 is correctly placed and functioning.

Figure 5:
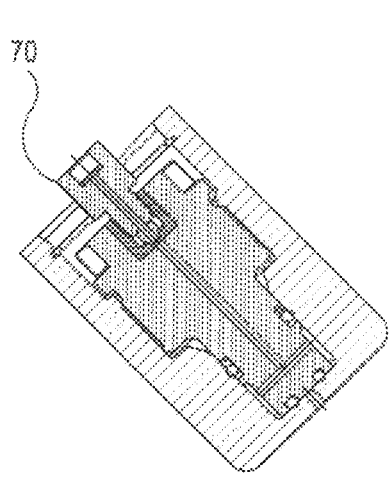
FIG. 5 is an enlarged view of the area shown as C in FIG. 3.
Figure 6:
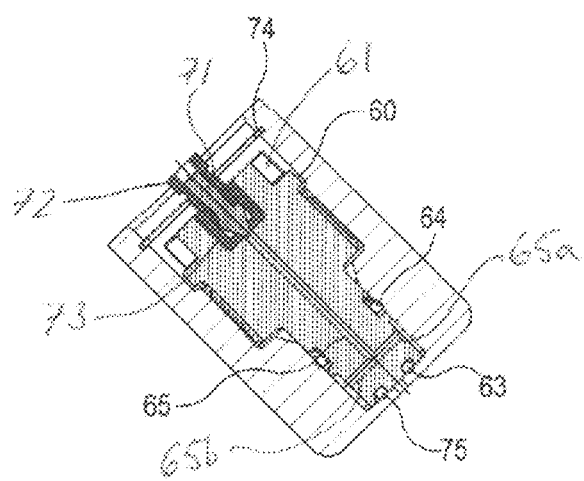
FIG. 6 is a further enlarged view of the area shown as C in FIG. 3.

In more detail with respect to the test plug 60, which is shown in more detail in FIGS. 5 and 6, this typically is supplied to a user incorporated into the box 20. The test plug 60 is housed in a specifically designed recess or atrium 61, defined by atrium walls, in the oblique surface 27 of the connecting surface 26 of the box 20. The test plug 60 includes a face seal 63, which in the exemplified embodiment is an O-ring, specifically a Parker O-ring HNBR Xplor H9T21. In a further preferred embodiment, the face seal 63 is housed on the atrium base. A further seal 64 comprises an O-ring (specifically a Trelleborg O-ring HNBR Xplor H9T21) with a backup O-ring (specifically Trelleborg ZURCON Z43).

Figure 7:
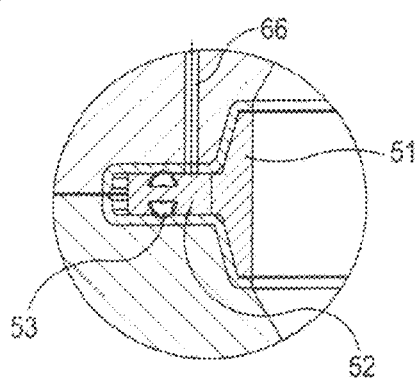
FIG. 7 is an enlarged view of the area shown as D in FIG. 3.

Pressure test fluid is passed through the test plug 60 and proceeds through the test plug 60 via the conduit 65, said conduit fluidly engaging a first end of a conduit 66. Additionally, the conduit 65 has side arms 65a, 65b linking the conduit 65 with the exterior of the plug 60. The side arms 65a, 65b open from the test plug 60 inwardly of the seal 64 so that pressure applied through the test plug 60 does not exit to atmosphere along the outside of the test plug 60. The conduits 65, 66 combine to form a continuous conduit, with the conduit 66 including a dog-leg change in direction part way along its length. The second end of the conduit 66 as shown in FIG. 7, exits and is in fluid contact with the exterior of the seal 51.

The second end of the conduit 66 engages the exterior of the seal 51 at right angles. This angle does not improve fluid flow, but the configuration shown aids in 2 respects. First, the manufacture of the conduit 66 is facilitated allowing a first portion to be drilled through the collar 22 and meeting up with the conduit drilled through from the surface 67 of the collar 22. The second reason is that although allowing the conduit 66 to engage the exterior of the seal at an oblique angle would allow a straight conduit to be drilled through, and so avoid any fatigue caused within the box section by the dog-leg, the oblique orientation of the conduit would itself cause problems. The oblique orientation would lead to fatigue within the region of the box section adjacent the surface 67, which can lead to increased propagation of stress fractures in that region. As this region is more critical to the integrity of the seal, it is advantageous to have the dog-leg formation.

The pressurising fluid is passed into the conduit 65 via the arrangement generally referenced 70 at the in-use external part of the test plug 60. The arrangement 70 comprises the following elements: an autoclave medium pressure plug 71, a collar 72 and a gland 73. Each of the elements 71 to 73 has a quarter inch diameter and is rated to 20,000 psi. The test plug 60 and the other above described components are held in position by a standard internal retaining ring 74 of diameter 1.85 inches.

In use, a first test is carried out on the seal 51 whereby the test plug 60 is unscrewed so that the O-ring seal 63 is no longer energised in sealing contact with the face 75. The pressure measurement device is secured to the plug 71 and test fluid passed through the arrangement 70 and via the conduit 65, 66 to the exterior of the seal 51. Pressurised fluid is prevented from exiting outwardly around the outside of the test plug 60 by the seal 64 which seals the atrium from atmosphere. As the increased pressure is being directed to the exterior side of the unidirectional seal 51, the pressure applied is less than the working pressure intended for the pipe string, typically around 500 psi but can be close to working pressure, but sufficient to check that the seal can hold a reasonable pressure. Pressure applied through the fluid is here also held by the seals 53 and 64.

Once the seal 51 has been demonstrated to be sufficient to withstand the test pressure applied above, the pressure is released. The test plug 60 is then screwed into position such that the O-ring seal 63 is energised by being pushed into sealing engagement with the bottom of the recess 61.

The test plug itself is then pressure tested, to the expected working pressure of the pipe string. The pressure of the pressure test fluid is thus increased. This check determines the effectiveness of the seals 53 and 64, which can act as a secondary seal in the event of failure of the Grayloc® seal 51.

Once both of the tests have been successfully completed the pressure is released to atmospheric and the arrangement 70 is removed. A pressure resistant autoclave plug can then be inserted into the test plug 60. In an optional embodiment, not illustrated, a pressure gauge can be inserted in place of an autoclave plug to provide to an operator an indication of the functioning of the Grayloc® seal. This both provides a high-pressure seal, but also serves as an indicator to an operator that the particular pin 10/box 20 seal has been tested. This can be recorded in the operations management system of the operator.

Figure 8A:
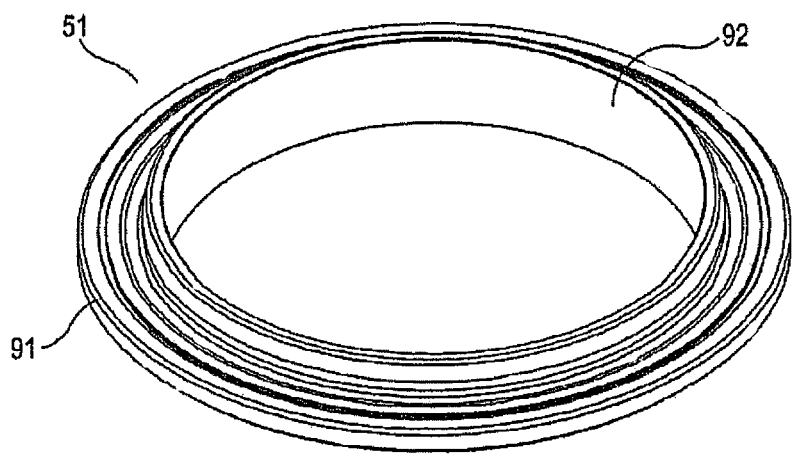
FIGS. 8*a* and 8*b* are respectively a perspective view of a seal element and a sectional view through said seal element including a further seal.
Figure 8B:
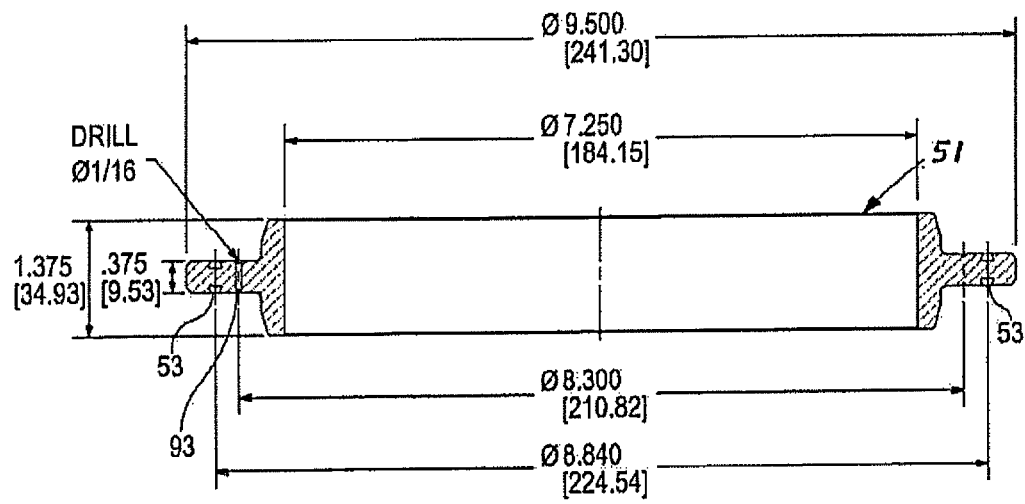

FIGS. 8a and 8b show the seal element 51 in greater detail. The seal element 51 has a generally annular shape. The outer annular portion 91 extends in use partially between the adjacent ends of the pin 10 and the box 20. The central section 92 extends axially and is in use located at least partially into the main body of the tubular pipe sections of the pin 10 and the box 20. A conduit 93 can be seen within the seal element 51 which allows pressure fluid to flow from one side of the seal element 51 to the other to ensure during testing that the seal formed is fully tested.

With regard to the pin 10 section, as indicated above this has to play a supporting role for the weight of the pipe string between the pipe 10 and the sea-surface. Moreover, because the pipe string has an inherent flexibility to aid in withstanding sea currents, the pin 10 must also be able to cope with lateral forces. In addition, the design of the tubular portion of the pin 10 in the region directly below the seal is typically used by an elevator when lifting a pin in and out of position. Such repeated lifting can lead to fatigue in that region.

One option to provide necessary strength to the pin 10 section would be to increase the thickness of the entire wall of the pin 10 section. This would however cause the pin 10 section to be excessively heavy, and also increase the manufacturing and installation difficulties. The pin 10 as disclosed above ameliorates this problem through the provision of a stress relief groove 100. As an example of the depth of the groove 100, for a pin section having an outer diameter of 28", the groove 100 would have an outer diameter of 25". Further the radial surface of the groove 100 is concave as viewed from the outside of the pipe, so that the ends of the radial surface of the groove 100 curve outwards radially to meet the axially facing walls 101, 102 of the pin 10.

The invention claimed is:

1. A pipe joint formed between a pin section and a box section, the pipe joint comprising:
   the pin section and the box section each having a tubular pipe section, engaging at respective first ends in end-to-end arrangement and having a seal element partially therebetween;
   the box section including a collar extending from the first end, the collar being generally cylindrical, axially aligned with the tubular pipe section of the box section and having an inner diameter of the same size as an outer diameter of the pin section, enabling the collar to be placed about the pin section;
   the pin section and the box section being secured together by means of a plurality of securing means housed in the collar and actuable to exert radial pressure to urge the pin section and the box section into sealing arrangement;
   the collar of the box section including a test port, comprising a housing atrium, defined by an atrium wall, housing a test plug;
   the housing atrium and the seal element being fluidly linked by a box conduit;
   the test plug comprising a plug body and a plug seal housed between the plug body and the atrium wall to seal the housing atrium from atmosphere and having therethrough a plug conduit connectable at a first end to a pressure test apparatus and fluidly linkable at a second end to the box conduit; and
   the test plug being moveable between a first position forming a fluid link between the plug conduit and the box conduit, and a second position closing the fluid link.

2. The pipe joint according to claim 1, wherein the collar includes a collar connection section connecting the collar to the tubular pipe section, the collar connection section having an outer surface which is at an oblique angle to axes of the collar and the tubular pipe section.

3. The pipe joint according to claim 2, wherein the collar connection section is of frusto-conical shape.

4. The pipe joint according to claim 2, wherein the test port is located in the collar connection section.

5. The pipe joint according to claim 1, wherein the joint includes a further seal between first ends of the pin section and the box section and radially outward from the seal element.

6. The pipe joint according to claim 5, wherein the further seal is an elastomeric seal.

7. The pipe joint according to claim 1, wherein the plug conduit has laterally deployed side arms connecting the plug conduit with an exterior of the test plug.

8. The pipe joint according to claim 1, wherein the box conduit engages the seal element at a right angle.

9. The pipe joint according to claim 1, wherein the box conduit includes a dog-leg.

10. The pipe joint according to claim 1, wherein an elastomeric seal is interposed between an end-face of the plug body and the atrium wall, the seal sealing the box conduit from outside of the plug body when the plug body is in the second position.

11. The pipe joint according to claim 10, wherein the elastomeric seal is housed on the atrium wall.

* * * * *